David W. Rabenhorst
INVENTOR

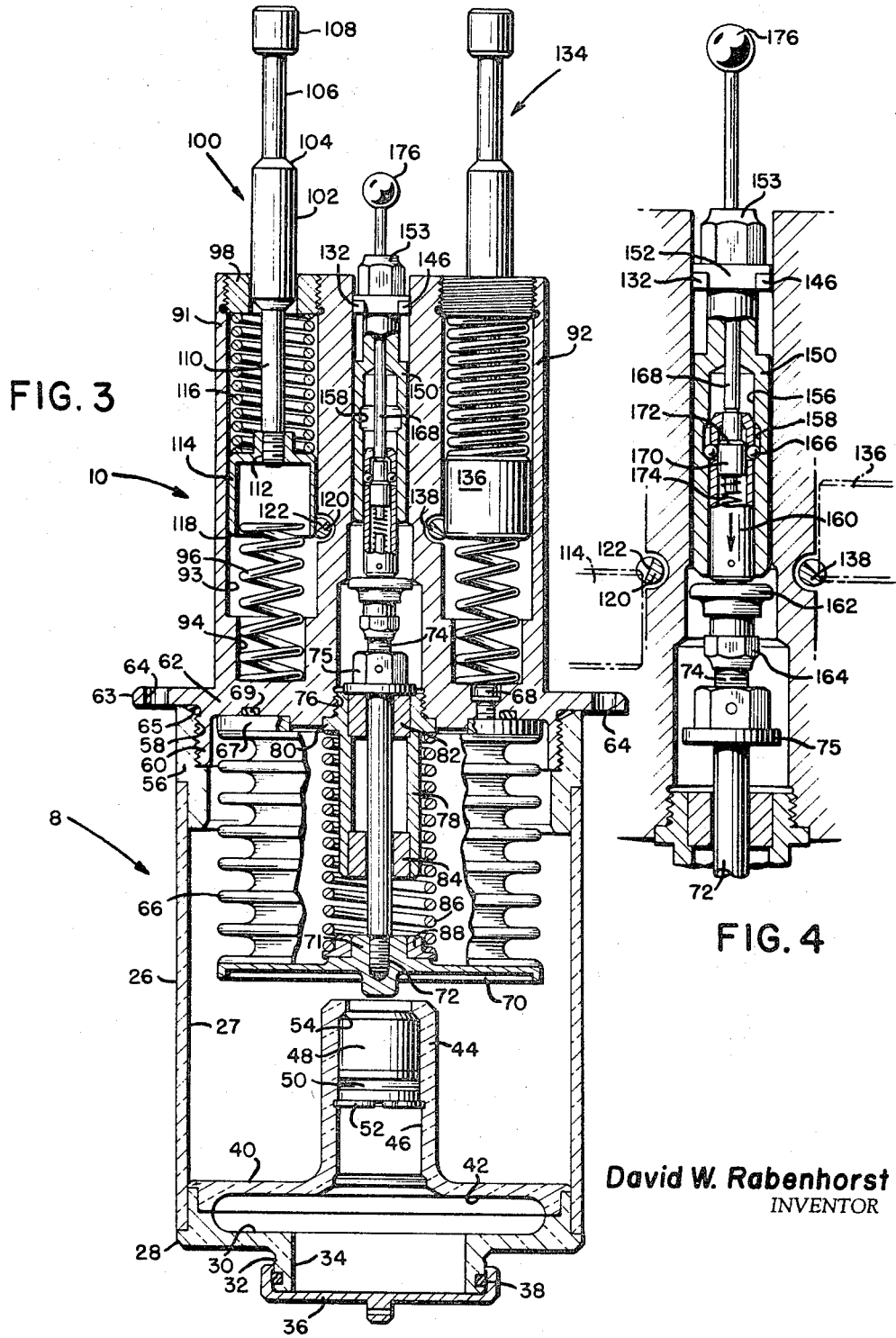

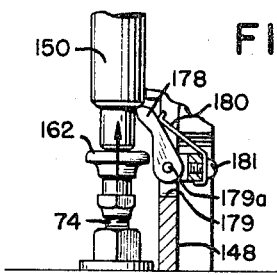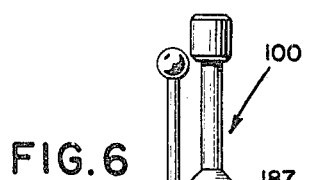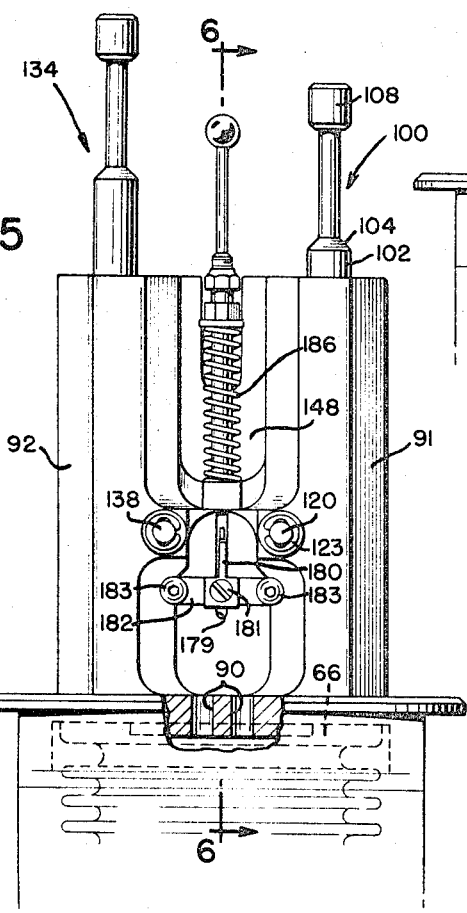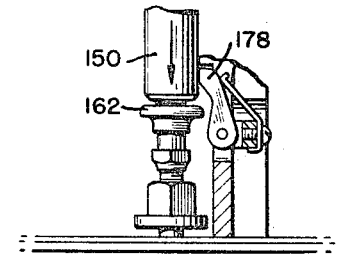

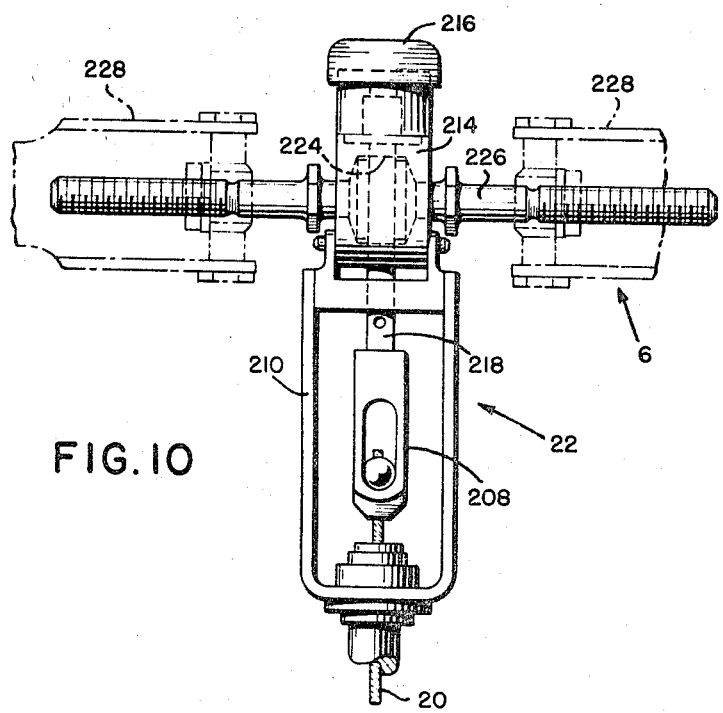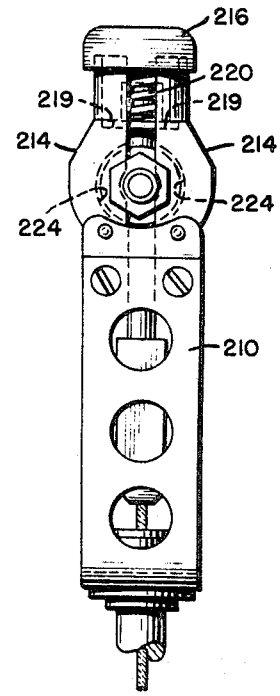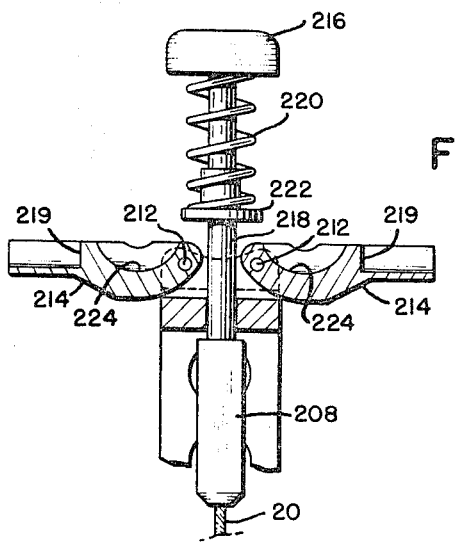

United States Patent Office 3,431,854
Patented Mar. 11, 1969

3,431,854
PASSIVE SEPARATION SYSTEM
David W. Rabenhorst, Silver Spring, Md., assignor to the United States of America as represented by the Secretary of the Navy
Filed Aug. 4, 1967, Ser. No. 658,988
U.S. Cl. 102—49.4
Int. Cl. F42b 15/10
9 Claims

ABSTRACT OF THE DISCLOSURE

The invention relates to a mechanically operable system to accomplish separation of a satellite from its launch vehicle, release of despin weights and launch vehicle tip-over subsequent to satellite separation. The device includes a pneumatic timer, an assembly of triggers operatively connected to the timer, a clamp cooperating with a trigger to releasably fasten a satellite to a launch vehicle and a tip-over rocket operable by one of the triggers for diverting the flight of the launch vehicle. The timer comprises a bellows which collapses upon reaching a near vacuum environment. A plunger attached to the bellows is advanced upon the collapse of the bellows to engage the triggers. The bellows is surrounded by a chamber that is evacuable through a slow metering orifice to the low pressure environment. The slow evacuation of said chamber permits a gradual expansion of the bellows and a slow retraction of the plunger, which retraction effects delayed sequential releases of the triggers, thereby actuating sequentially the releasable clamp and the tip-over rocket.

BACKGROUND OF THE INVENTION

Field of the invention

The present invention relates to a separation system for a satellite and its launching vehicle, which system is mounted on the upper portion of a launch vehicle and automatically operates to separate a satellite from the launch vehicle upon exposure to an outer space environment.

Description of the prior art

In previous satellite separation systems the hot exhaust gases of a launch vehicle ignite a sublimation switch which initially provides electrical shorts across a number of battery powered ordnance circuits. When the sublimation switch is completely expanded, the shorts are removed, allowing current to flow through the circuits, and fire explosive squibs. One fired squib severs a frangible Marmon clamp that attaches a satellite to the launch vehicle. Another fired squib ignites the fuel of a small solid fuel rocket which is used to tip-over the launch vehicle in order to avert a collision between it and the satellite separated therefrom.

SUMMARY OF THE INVENTION

The present invention relates generally to a mechanical separation system for performing functions in an outer space environment and, more particularly, to an automatic system for separating a satellite from a launching vehicle and for performing other associated functions without the need for electronic or pyrotechnic components.

The present system is designed to be triggered automatically in a near vacuum environment without batteries, wiring or other electrical components, and is operable without the presence of unsafe destructive forces. It is adaptable for use with any launch vehicle and payload and its components may be employed collectively or used separately in other payload separation systems or other mechanical systems. A distinct advantage of the present system in that it may be stored in an operative condition or tested repeatedly without destroying the operative condition of each component part. Three principal functions which the invention performs are: releasing despin weights to despin the last stage of a launching vehicle, separating a payload from the launching vehicle, and diverting the trajectory of the launching vehicle to prevent its collision with the separated satellite.

Accordingly, it is an object of the invention to provide means for separating a payload from a launching vehicle.

A further object of the invention is to provide apparatus for releasing despin weights from a launching vehicle, separating a payload from the launching vehicle and actuating an impulse generating rocket which tips the launching vehicle away from the separated payload.

A still further object of the invention is to provide means for releasing despin weights from a launching vehicle and for separating a payload from the vehicle.

Another object of the invention is to provide a timer and a plurality of triggers for actuating a release mechanism and an impulse generating rocket without the need for electronic or pyrotechnic components.

Still a further object of the invention is to provide a system for releasing despin weights from a launching vehicle, separating a payload from a launching vehicle, and providing an impulse to divert the flight of an aerospace vehicle without the need for pyrotechnic or electrical components, which system may be stored or repeatedly operated wtihout destruction or deterioration of components and without hazard to adjacent equipment or personnel.

Other objects and many of the attendant advantages of the present invention will be readily appreciated as the same becomes better understood by reference to the following detailed description when considered in conjunction with the accompanying drawings, wherein:

BRIEF DESCRIPTION OF THE DRAWINGS

FIG. 3 is a vertical section on the line 3—3 of FIG. 2, showing both triggers in unfired positions;

FIG. 4 is a detail section of a portion of the device shown in FIG. 3, particularly illustrating the position of the slidable latch plunger when one of the triggers is in the fired position as shown in FIG. 2;

FIG. 5 is a side elevation of the trigger assembly showing the slidable latch plunger and associated latching mechanism;

FIG. 6 is a section along the line 6—6 of FIG. 5, particularly illustarting the position of the latching mechanism when one of the triggers is in the fired position as shown in FIG. 2;

FIG. 7 is a detail section partly in elevation, showing the latching mechanism illustrated in FIG. 6, in a position with one of the triggers in an unfired position;

FIG. 8 is a detail section showing the position of the latching mechanism of FIG. 6 with one of the triggers in a fired position;

FIG. 10 is a front elevation of one of the releasable clamps according to the invention;

FIG. 11 is an end view of the clamp shown in FIG. 10;

FIG. 12 is an end elevation, partly in section, of the clamp shown in a released position;

DESCRIPTION OF THE PREFERRED EMBODIMENTS

Figure 1:
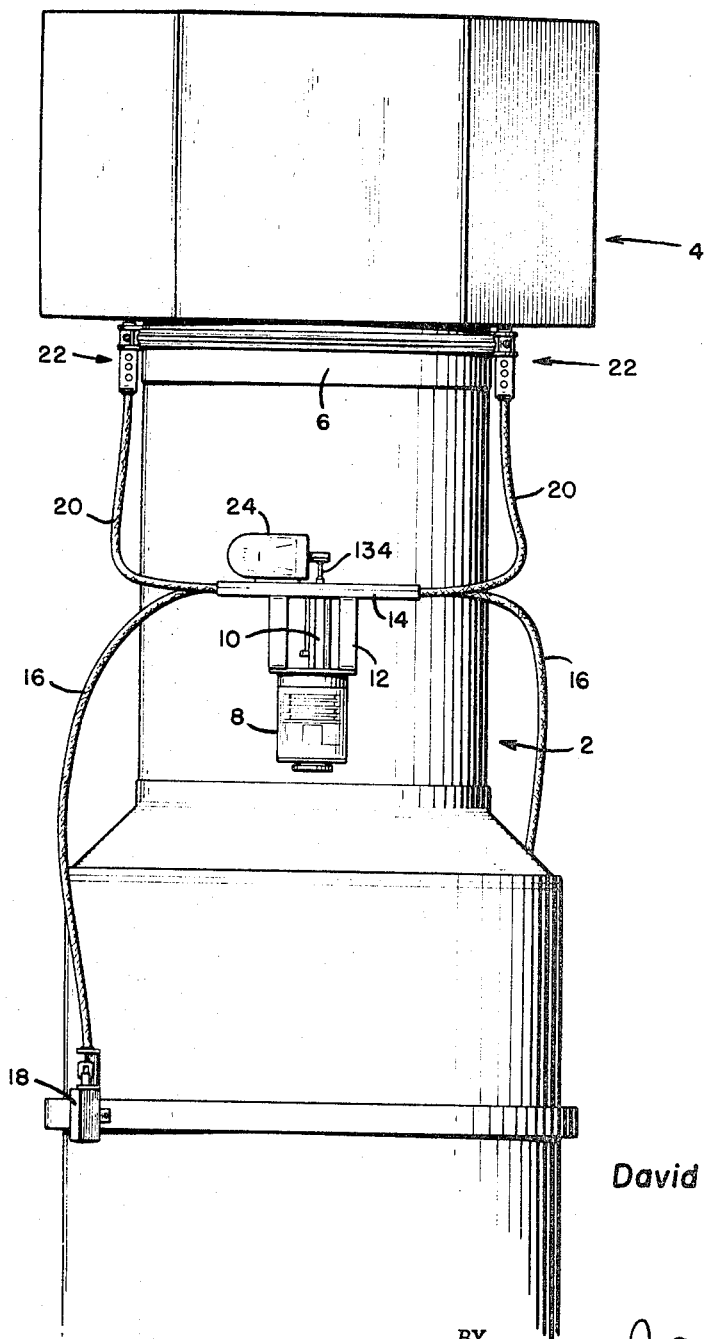
FIG. 1 is a front elevation illustrating a payload atop a launch vehicle and the separation system according to the invention.

With more particular reference to the drawings, there is shown in FIG. 1 a launching vehicle 2 having a payload 4, such as a satellite, releasably secured thereto by a well-known Marmon-type collar 6. The passive separation system according to the present invention is also illustrated generally in FIG. 1 and comprises a timer 8 secured to a trigger assembly 10, which is in turn fastened to the upper end of the launch vehicle 2 by a mounting bracket 12. A horizontal tray 14 is carried by the mounting bracket 12, which tray receives cable release plungers connected to a first pair of cables 16, each of which is operatively attached to a despin weight release mechanism 18, of a type well-known in the art. The tray 14 also receives cable release plungers connected to a second pair of cables 20, each of which operatively engages a clamp 22 which releasably retains under considerable tension the ends of the Marmon collar 6.

With particular reference to FIG. 3, the composite parts of the timer 8 and the trigger assembly 10 are shown in greater detail. The timer 8 comprises an outer cylindrical casing 26 defining an air storage chamber 27 that is closed at its lower end by an end cap 28 attached and sealed to the casing by an adhesive such as epoxy. The end cap 28 is provided with a recess 30 and a central neck 32 having a bore 34 communicating with the recess 30. A displaceable closure cap 36 is provided over the end of the neck 32 and is held in place by frictional engagement with an annular seal 38. A cover plate 40 is secured to the end cap 32 by adhesive and is provided with a recess 42 which cooperates with the recess 30 to provide a space for storing a quantity of air under atmospheric pressure, which air is used to displace the closure cap 36, in a manner to be more fully described. The cover plate 40 is additionally provided with a neck 44 extending into the air storage chamber 27, and having a bore 46 that provides an air passageway between the air storage chamber 27 and the air space in the end cap 28. Housed within the neck 44 is a slow metering orifice assembly 48, such as the Viscojet manufactured by the Lee Company, Westbrook, Conn. The Viscojet is provided to meter the air from the air storage chamber 27 slowly through the neck 32 of the end cap 28 and to the atmosphere, in a manner to be later described in detail. An O-ring 50 surrounds the Viscojet and provides an airtight seal between the wall of the Viscojet and the wall of the bore 46. A snap ring 52 retains the Viscojet against a shoulder 54 provided on the wall of the bore.

The upper end of the casing 26 is attached by adhesive to a metal reinforcing ring 56. The ring 56 is internally threaded at 58 for positive attachement to an externally threaded cup 60, provided on the bottom wall of an end cap 62, which cap defines the upper end of the air storage chamber 27.

The end cap 62 is provided with an annular external mounting flange 63 which has a plurality of spaced apertures 64 for receiving mounting screws, not shown for securing the timer to the bracket 12. The lip of the metal reinforcement ring 56 is bevelled to provide a space adjacent to the junction of the cup 60 and the annular flange 73, which space receives and O-ring seal 65 that ensures an airtight fit between the metal reinforcing ring 56 and the end cap 62.

Within the air storage chamber 27 is a collapsible bellows 66. At its upper end, said bellows has an end plate 67 attached to the bottom wall of the cup 60 by a plurality of cap screws, one of which is shown at 68. A ring seal 69 is pressed by the bellows end plate 67 into a groove provided in the bottom wall of the cup 60, thereby sealing the bellows interior from the air storage chamber 27. The lower end of the bellows is sealed by an end plate 70 having a central thickened portion 71. The end of an elongated timer actuating shaft 72 is threadably attached in said thickened portion. Said shaft extends through the bellows 66 along its length and protrudes through the end cap 62 of the air storage chamber 27, as shown at 74. As more clearly shown in FIG. 4, a flanged nut 75 is threaded onto the protruding portion 74 of the actuating shaft 72. When the bellows 66 is fully expanded, as shown in FIG. 3, the base of the nut 75 abuts the top wall of the end cap 62, thereby preventing excessive expansion of said bellows.

With reference still to FIG. 3, the end cap 62 is provided with a central tapped bore 76 which receives a threaded end portion of a supporting sleeve 78 extending within the confines of the bellows. Adjacent said bore 76 is a recess which receives a ring 80 integral with the outer wall of the supporting sleeve 78. A bushing 82 is secured in the threaded end portion of said supporting sleeve and slidably receives the protruding portion 74 of the actuating shaft 72. The other end of the supporting sleeve 78 receives a bushing 84 that supports slidably the approximate midportion of the actuating shaft 72. Additionally, said bushing 84 provides a stop against which the bellows end plate 70 abuts when the bellows is collapsed. Surrounding the supporting sleeve 78 and the actuating shaft 72 is a coil spring 86. A flanged washer 88 is mounted over the thickened portion 71 of the bellows end plate 70 and retains the coil spring 86 against the ring 80 on the supporting sleeve 78. As best shown in FIGS. 2, 5, 6 and 9, a plurality of vent holes 90 are provided in the end cap 62, and within the perimeter of the bellows and plate 66, to vent the bellows interior to the atmosphere.

The timer 8 is especially suited for use on a payload, such as a satellite, in a near vacuum environment. When the timer is assembled in a normal atmospheric pressure environment, it is completely passive and will not operate. When exposed to the near vacuum environment of outer space, air, under atmospheric pressure within the space at the end plate 32, will expand and displace the closure cap 36, thereby exposing the slow metering orifice 48 to the outer space environment. The air within the bellows 66 will escape through the vents 90, thereby causing the bellows to collapse and advance the actuating shaft 72. The air within the air storage chamber 27 will slowly escape through the orifice 48. As the storage chamber is thus evacuated, the coil spring 86 will expand the bellows, thereby slidably retracting the actuating shaft 72 at a slow rate. By properly adjusting the relative volumes of the air chamber 27 and the bellows 66, the rate of movement of the retracting shaft 72 may be selectively controlled with a high degree of accuracy. The apparatus thus described comprises a timer for controlling the rate of movement of the actuating shaft 72, which shaft may be operatively connected to a device, such as the trigger assembly 10, now to be described.

With reference to FIG. 3 there is shown a preferred embodiment of the trigger assembly 10, the base of which forms the end cap 62 of the timer air storage chamber 27. However, it should be understood that the timer 8 may be constructed independently of the trigger assembly 10 so that either component can be used independently of the other. The trigger assembly 10, more specifically, comprises a pair of columnar trigger housings 91 and 92 which, as shown in FIG. 5, are of hexagonal configuration. As shown in FIG. 3, the housing 91 is provided with a longitudinal bore 93, the bottom portion 94 of which is reduced in diameter to receive the end portion of a coiled buffer spring 96. A generally cylindrical bushing 98 is threadably secured in the top portion of the bore 92. An elongated trigger, shown generally at 100 is received in the housing 91 shown in the left portion of FIG.

Figure 9:
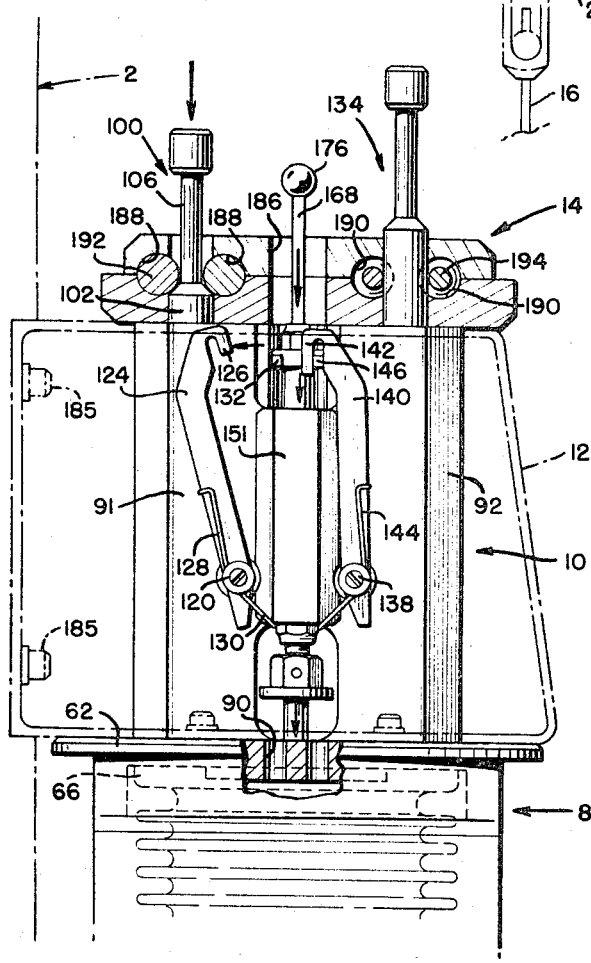
FIG. 9 is an elevation, partly in section, illustrating one of the triggers in a fired position and its associated hook in a released position.

3. More particularly, the trigger 100 has an enlarged diameter portion 102 which is slidably received by the bushing 98. Above the enlarged diameter portion is a frusto-conical wall 104 which tapers toward a reduced diameter portion 106 that terminates in an enlarged diameter end portion 108. The lower end portion 110 of the trigger 100 is of reduced diameter and is threadably attached at 112 to the base of a bearing cup 114, slidable within the bore 92. A coil spring 116 surrounds the lower end portion 110 of the trigger and is confined between the bottom wall of the bushing 98 and the base of the bearing cup 114. The lip of the bearing cup is provided with an external bevel 118. As shown in FIGS. 3 and 4, a pin 120 extends transversely through the columnar housing 91 and has a flat surface 122 which engages the beveled lip 118 of the bearing cup 114. In an unarmed position of the device, as shown in FIG. 3, the bearing cup 114 is retained by the pin 120 in spaced relationship above the buffer spring 96, thereby compressing the coil spring 116 between the base of the bearing cup 114 and the bottom wall of the bushing 98. As shown in FIG. 5, the pin 120 is held by a snap ring 123. As shown in FIG. 9, the pin 120 protrudes transversely through the opposite side of the housing 91 where it is rigidly attached to the lower end of a hook 124 having a bill 126. A wire spring 128 engages the hook 124 and is anchored at 130 to the housing 91, thereby biasing the hook 124 toward a vertical orientation. Normally the bill 126 engages a rectangular peg 132 which retains the hook in a vertical orientation. Since the hook is rigidly attached to the pin 120, said pin is restrained from rotation. However, when the hook 124 is disengaged from the peg 132, in a manner to be described in more detail hereinafter, the pin 120 will no longer be restrained from rotation. Accordingly, the compressed coil spring 116 will force the bearing cup 114 against the pin 120 causing said pin to rotate to the position shown in FIG. 4. The hook 124, rigidly attached to the pin 120, will thus be pivoted to the position shown in FIG. 9. Additionally, the compressed coil spring 116 will provide a snap force that will bias the bearing cup 114 to a new position, as shown in phantom in FIG. 4, past the rotated pin 120 and stopped against the buffer spring 96. The elongated trigger 100 will then be moved to a lower position, i.e. a fired position, as shown in FIGS. 5 and 9. The columnar housing 92 includes structure which is generally similar to that in the housing 91. Accordingly, a trigger 134, associated with said housing 92, is actuated in the same manner as the trigger 100. More particularly, the trigger 134 is attached to a bearing cup 136 which bears against a pin 138. As shown in FIG. 9, the pin 138 protrudes from the housing 92 and is rigidly attached to a hook 140 having a bill 142, the bill 142 being of greater length than the bill 126 of the hook 124, for a purpose to be described hereinafter. The hook 140 is provided with wire spring 144 and is releasably engageable with a peg 146.

With reference to FIGS. 5 and 6, the columnar housings 91 and 92 are connected by a web 148, the wall of which slidably receives a generally cylindrical arming sleeve 150. A cover plate 151 retains the arming sleeve against the web 148. In FIG. 3, the arming sleeve is shown midway between the columnar housings 91 and 92. In FIG. 4, a more detailed view of the arming sleeve 150 is illustrated. With reference to FIGS. 3 and 4, said arming sleeve is provided at its upper end with a collar 152 secured by a nut 153. The collar 152 is provided with the spaced rectangular pegs 132 and 142 on which the hook bills 126 and 142 engage. The arming sleeve 150 is additionally provided with a longitudinal bore 156 having an annular recess 158. Said bore receives therein a slidable tubular housing 160, which housing has secured to its lower end an enlarged diameter knob 162 that is threadably connected by a nut 164 to the end 74 of the timer actuating shaft 72. The walls of the housing 160 are apertured to receive a plurality of locking balls 166.

Slidable within the housing is a latch plunger 168 having an enlarged diameter lower end portion 170 with a bevelled shoulder 172. Said lower end portion also includes a reduced diameter pin 173 which receives thereabout the upper end of a resilient coil spring 174. The top portion of the slidable latch plunger protrudes through the top of the arming sleeve 150 and is provided with a knob 176, that may be grasped for manually adjusting the position of the latch plunger during assembly of the device.

With the device in an unarmed position as shown in FIG. 3, the locking balls 166 engage the bevelled shoulder 172 of the latch plunger 168, thereby restraining it against the resilient action of the coil spring 174, for decoupling the timer actuating shaft 72 from the trigger assembly 10. As shown in FIG. 7, a spring loaded pawl 178 engages the lower terminal end of the arming sleeve 150 to prevent accidental movement of the collar 152 and its associated pegs 132 and 146 from the hook bills 126 and 142. The pawl 178 is pivotally mounted in an opening 179 provided in the web 148 by a pin 179a. A flat spring 180, having its lower end mounted on a bracket 181 by a screw 182 and its upper end engaging the pawl 178, biases said pawl into engagement with the arming sleeve 150. The bracket is secured to the web by screws 183.

With reference to FIGS. 5 and 6, the collar 152, secured to the top of the arming sleeve 150 is elongated and spans the web 148 to mount slidably an elongated guide pin 184, the base of which is threadably secured in a shoulder 185 which is integral with the web 148. A coil spring 186 surrounds the rod 184 and is engaged between the shoulder 185 and the collar 152. A nut 187 is threadably attached to the top of the rod 184 and acts as a stop against which the collar 152 engages.

The trigger assembly 10 is armed upon full collapse of the bellows 66, which advances the timer actuating shaft 72 until, as shown in FIG. 8, the pawl 178 is disengaged from the end of the arming sleeve 150 by the camming action of the enlarged diameter knob 162. The arming sleeve 150 will thereby be allowed to move downwardly as shown in FIG. 8, without interference from the pawl 178. As the sleeve 150 moves downwardly the elongated collar will slide on the rod 184, against the action of the coil spring 186, the rod thereby acting as a guide to insure a smooth downward movement of the sleeve 150. Simultaneously as the pawl 178 is disengaged, the slidable latch plunger 168 locks the arming sleeve 150 to the timer actuating shaft 72. More particularly, and with reference to FIG. 4, the actuating shaft 72 is advanced by the collapse of the bellows 66. The slidable, ball-carrying housing 160 is also advanced thereby, and the locking balls 166 are engaged in the annular recess 158 of the bore 156. The enlarged diameter end 170 of the slidable latch plunger 168 is biased upwardly by the action of the resilient spring 174 so that it locks the balls 166 in the annular recess 158, thereby coupling the timer actuating shaft 72 to the arming sleeve 150.

The triggers 108 and 134 are fired upon the expansion of the bellows 66 subsequent to its movement to a fully collapsed position, which position is necessary to arm the trigger mechanism 10, as described above. Thus, the arming sleeve 150, coupled to the timer actuating shaft 72, is retracted along with said timer actuating shaft 72 upon the expansion of said bellows 66. The pegs 132 and 146, attached to the collar 152 on the arming shaft 150, thereby slidably disengage from the hook bills 126 and 142.

As previously described, and shown in FIG. 9, the hook bill 126 is shorter than the hook bill 142. Accordingly, said shorter hook bill will be first disengaged from its peg 132, thereby allowing the trigger 100 to fire as described above. In a similar fashion the trigger 134 will also fire as the bellows 66 continues to expand. Such sequential firing of the triggers is desirable in the present separation system for the following reasons. The first trigger 100, upon firing, will actuate the cables 16, in a manner to be described hereinafter, and release the despin weight 18. Said weight is allowed time to deploy fully by purposely providing the delay between firing of the trigger 100 and the trigger 134. After the despin weight is fully deployed, the trigger 134 will then fire, in a manner to be described, to actuate the cables 20 and the rocket 24.

Figure 2:
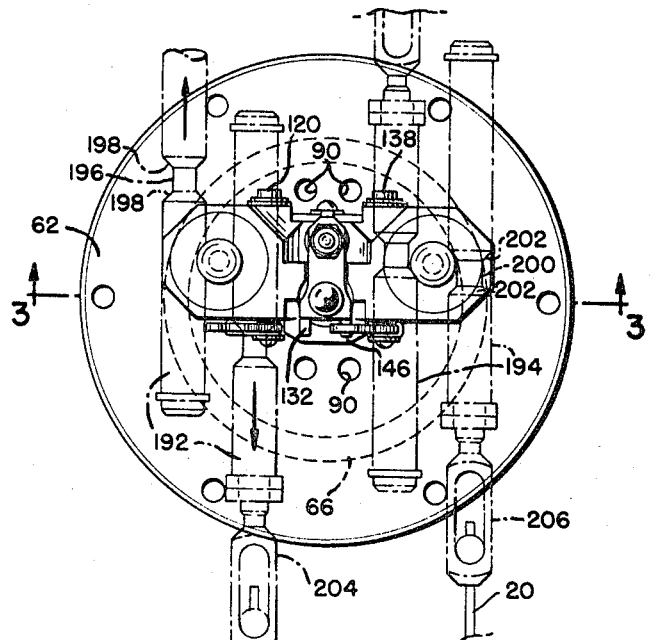
FIG. 2 is a top plan view of the timer and trigger assembly of the invention, with cable release plungers shown in phantom, and with one trigger shown in a fired position.

With more particular reference to FIGS. 1 and 9, the timer 8 and trigger assembly 10 are secured by well-known means to the mounting bracket 12, shown in phantom in FIG. 9. The mounting bracket 12 is fastened to the upper end of the launching vehicle 2, shown in phantom in FIG. 9, by a plurality of cap screws 185. As more particularly shown in FIG. 9, the tray 14 is mounted on the mounting bracket 12 and is provided with a central bore 186 to freely receive the upper end of the latch plunger 168. The tray 14 is additionally provided with four horizontal bores, such as shown at 188 and 190. With reference to FIG. 2, the bores 188 each receive a slidable cable release plunger 192, and the bores 190 each receive a similar release plunger 194. Each of the cable release plungers 192 is provided with a reduced diameter portion 196 flanked on either side by frusto-conical walls 198. Similarly the cable release plungers 194 each has a reduced diameter portion 200 flanked by frusto-conical walls 202. With reference to FIGS. 1 and 2, the cable release plungers 192 are connected by well-known lanyard fasteners 204 to the release cables 16, operatively connected to the despin weights 18. The slidable cable release plungers 194 are connected by lanyard fasteners 206 to the release cables 20, operatively connected to the releasable clamps 22. The cable release plungers 192 are actuated in the following manner. Initially, said plungers are aligned in the tray 14 with their reduced diameter portions 196 on opposed sides of the enlarged diameter portion 102 of the trigger 100. The cables 16 exert tension on the plungers 192, causing the frusto-conical walls 198 thereof to engage the trigger 100. When the trigger 100 is fired, as described above, it will quickly move to the lower position shown in FIG. 9, and its enlarged diameter portion 104 will disengage from the frusto-conical walls 198 of the cable release plungers 192. The reduced diameter portion 106 of the trigger 100 will thereby move into alignment with the cable release plungers 192. The cable release plungers 192 will slide in the direction of the arrows as shown in FIG. 2, thereby relieving the tension exerted by the cables 16 and releasing the despin weights 18 in the well-known manner. The cable release plungers 194 are actuated in a similar fashion, the cables 20 providing the required tension on said plungers to cause them to slide upon firing of the trigger 134.

With particular reference to FIGS. 1 and 10, the cables 20 are each connected by a lanyard fastener 208 to a releasable clamp, shown generally at 22. The clamp comprises a mounting bracket 210 upon which are hingeably attached at 212 a pair of clamp arms 214, which are initially folded together in abutting relationship and maintained in position by a recessed cap 216 impressed over and encircling the upper terminal portions of the clamp arms, said arms being shaped to receive said cap. A shaft 218 connects the cap to the lanyard fastener 208. As shown in FIGS. 11 and 12, the clamp arms 214 are provided with recesses 219 which initially receive a coil spring 220 that surrounds the shaft 218 and has attached thereto a flanged bushing 222, slidable on the shaft 218 and engaged on the bottom walls of the recesses 219. The coil spring 220 is thereby compressed between the cap 216 and the bottom wall of each recess 219, and provides the tension on the cable 20 that is necessary to slidably actuate the cable release plungers 194. As clearly shown in FIGS. 10, 11 and 12, the hinged clamp arms 214 are provided with additional recesses 224 accommodating the terminal, pintle-shaped ends of a pair of bolts 226 on the respective ends 228 of the Marmon collar 6, shown in phantom in FIG. 10. Thus, when the clamp arms 214 are folded beneath the cap 216, the bolts are retained, despite their being under considerable tension, in the recesses 224 of the clamp arms 214. Upon firing of the trigger 134, as described, the tension on the cable 20 will be relieved, allowing the coil spring 220 to expand and resiliently bias the cap 216 away from the clamp arms 214. The clamp arms 214 will unfold, thereby releasing the bolts 226. The Marmon collar 6 will then fall away from the launch vehicle 2, allowing the payload 4 to separate therefrom.

Figure 13:
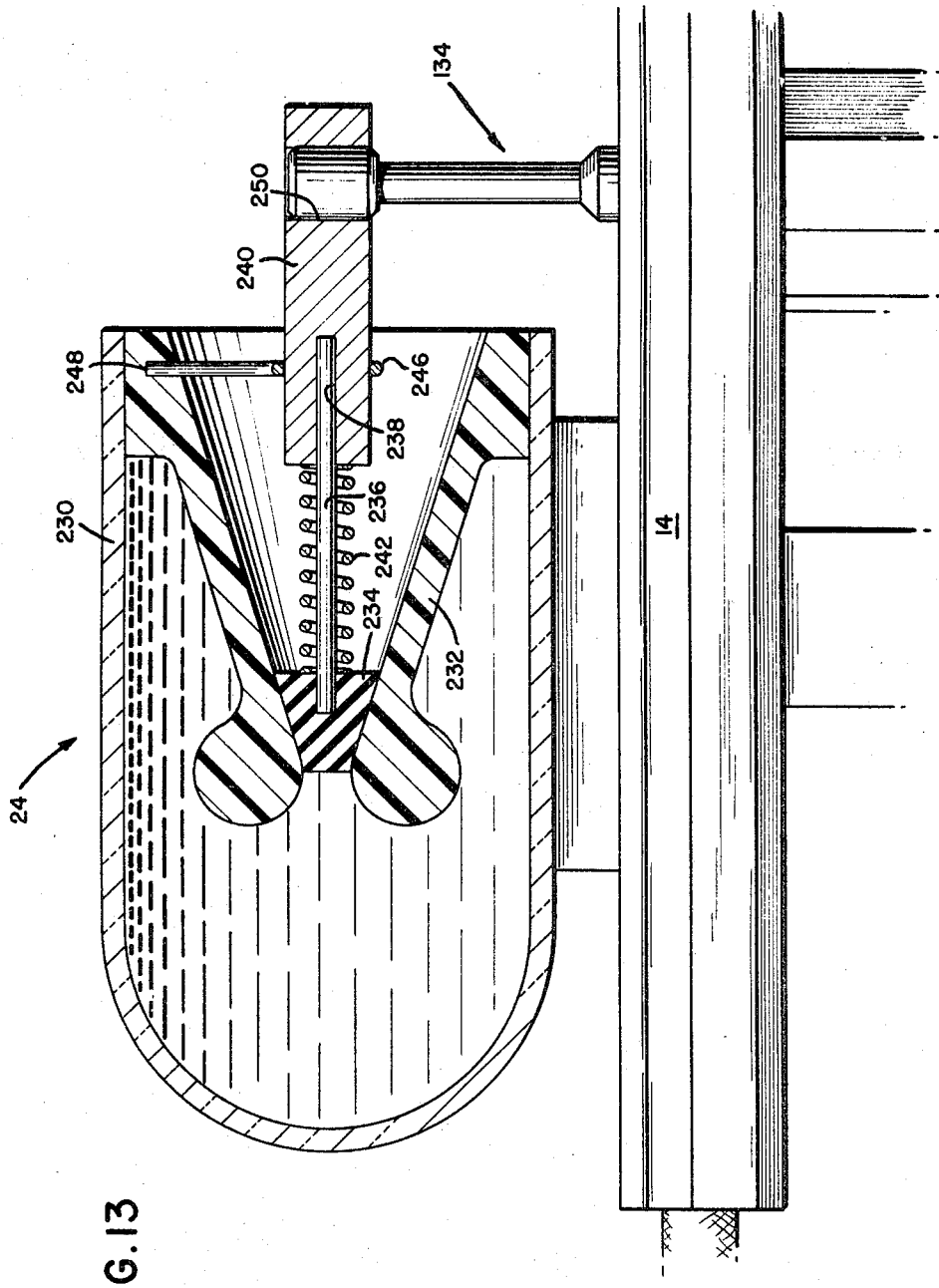
FIG. 13 is a detail section illustrating the rocket utilized to divert the trajectory of the launching vehicle after separation of the payload from said launching vehicle, said rocket being shown in pre-fired condition and connected with one of the triggers.

As shown in FIGS. 1 and 13, a rocket 24 is operatively connected to the upper end portion of the trigger 134. The rocket body 230 is mounted on the tray 14 and is advantageously made from a transparent plastic such as Lexan to permit visual inspection of the fuel level therein. A nozzle 232, also fabricated of Lexan, is fastened by epoxy in one end of the rocket body. A closure seal for the nozzle comprises a neoprene plug 234 on the end of a plunger 236. The plunger is slidably received in a bore 238 provided in a cylindrical block 240. A coil spring 242 surrounds the plunger 236 and is compressed between the end of the block 240 and the neoprene plug 234, thereby forcing said plug into sealing engagement with the nozzle orifice. A wire ring 246 surrounds the block 240 and is pinned at 248 to the wall of the nozzle 232. Said ring laterally supports the block 240. The block 240 is provided with a transverse, vertical bore 250 which receives the enlarged upper end portion of the trigger 134. The rocket body 230 is filled with a quantity of a non-corrosive liquid such as Freon. In operation, the trigger 134 is fired in the manner above described, thereby disengaging itself from the block 240. The coil spring 242 will force the block to move away from the nozzle 232, allowing the neoprene plug 234 to move out of the nozzle orifice, thereby producing a thrust which is used to tip the launching vehicle 2 to prevent its collision with the separated payload 4.

Obviously, many modifications and variations of the present invention are possible in the light of the above teachings. It is therefore to be understood that within the scope of the appended claims, the invention may be practiced otherwise than as specifically described.

What is claimed is:

1. In a separation system for a satellite and a launching vehicle therefor,
    a timer having a collapsible bellows communicable to the ambient atmosphere,
    a casing surrounding said bellows and defining an air storage chamber and having a metering orifice communicable to the ambient atmosphere,
    an actuating shaft secured to a wall of said collapsible bellows,
    a housing,
    a slidable trigger in the housing,
    hook means for retaining said trigger in an unfired position, and
    a sleeve provided with a pin,
    said hook means releasably engaging said pin,
    said actuating shaft being actuable to positively engage said sleeve upon collapse of said bellows,
    said air storage chamber being evacuable to the atmosphere through said metering orifice to expand said bellows,
    said actuating shaft and said sleeve being retracted upon the expansion of said bellows,
    said pin on said sleeve being disengaged from said hook means upon the retraction of said sleeve whereby said trigger will be released by said hook means.

2. In a payload and a launching vehicle therefor, a passive system for separating the payload from the launching vehicle, comprising,
    a timer carried by the launching vehicle, said timer including an expansible member having a movable plate, fastening means for attaching the payload to the launching vehicle, and means cooperating with said timer for releasing said fastening means to detach said payload from said launching vehicle.

3. The structure as recited in claim 2 and further comprising means connected to said movable plate for actuating said cooperating means upon the expansion of said member.

4. The structure as recited in claim 2, and further including a despin weight release mechanism on said launching vehicle and releasably connected to said cooperating means, said timer including an expansible chamber having a movable plate, and means connected to said plate for sequentially releasing said despin weight release mechanism and said fastening means upon the expansion of said chamber.

5. The structure as recited in claim 4, wherein said timer includes a second chamber in communication with said expansible chamber, said second chamber including an orifice for metering the internal pressure of said second chamber to the outside atmosphere whereby said expansible member is caused to expand.

6. The structure of claim 2, wherein said fastening means comprises a collar on said payload and said launching vehicle, and a clamp including, a pair of hinged clamp arms, a cap for releasably holding said clamp arms in a clamping position, resilient means for biasing said cap to a position releasing said clamp arms, and means for releasably retaining said cap on said clamp arms against the action of said resilient means.

7. The structure as recited in claim 2, and further including a rocket body on said launching vehicle, a nozzle provided in one end of said rocket body, said nozzle having an orifice, and a plug in sealing engagement with said orifice, said cooperating means releasably retaining said plug in sealing engagement with said orifice, said cooperating means and said timer coacting to release said plug from engagement with said orifice.

8. In a system for separating a payload from a launching vehicle, a timer including an actuating shaft, a plurality of triggers mounted in unfired positions on said timer, and means engaging said triggers for retaining said triggers in unfired positions, said actuating shaft being movable in response to the presence of a low pressure environment to a position operatively engaging said retaining means, said timer further including a casing defining an air storage chamber having a metering orifice communicable to the low pressure environment, said actuating shaft being retracted by the evacuation of said air storage chamber through said metering orifice to sequentially disengage said retaining means from said triggers, whereby said triggers are moveable sequentially to fired positions.

9. The structure as recited in claim 8, and further including a tray provided with a plurality of bores for slidably receiving said triggers, said tray being provided with additional bores, a cable release plunger slidably received in each of said additional bores and operatively engaging one of said trigger.

a despin weight release mechanism provided with an actuating cable, said cable being under tension and secured to one of said release plungers, a releasable clamp provided with a pair of hinged clamp arms, a cap for releasably holding said clamp arms in folded positions, and an actuating cable releasably retaining said cap on said clamp arms, said cable being under tension and secured to another of said release plungers, said triggers being moveable sequentially to fired positions disengaging from said cable release plungers, whereby the tensions in said cables are relieved to actuate said despin weight release mechanism and unfold the clamp arms of said releasable clamp.

References Cited

UNITED STATES PATENTS

| | | | |
|---|---|---|---|
| 2,717,309 | 9/1955 | Campbell | 102—34.1 X |
| 3,029,735 | 4/1962 | Magyar | 102—49.4 |
| 3,128,845 | 4/1964 | Parker | 102—49.4 |
| 3,170,655 | 2/1965 | Pierce | 102—49.5 |
| 3,174,706 | 3/1965 | Wagner | 102—49.4 X |
| 3,264,948 | 8/1966 | Dilpare | 91—36 |
| 3,286,630 | 11/1966 | Salmirs et al. | 102—49.4 |
| 3,319,978 | 5/1967 | Melhose | 102—49.4 |

VERLIN R. PENDEGRASS, *Primary Examiner.*